July 28, 1959 W. E. BRIGGS ET AL 2,897,437
VACUUM LEAK DETECTION
Filed June 5, 1957
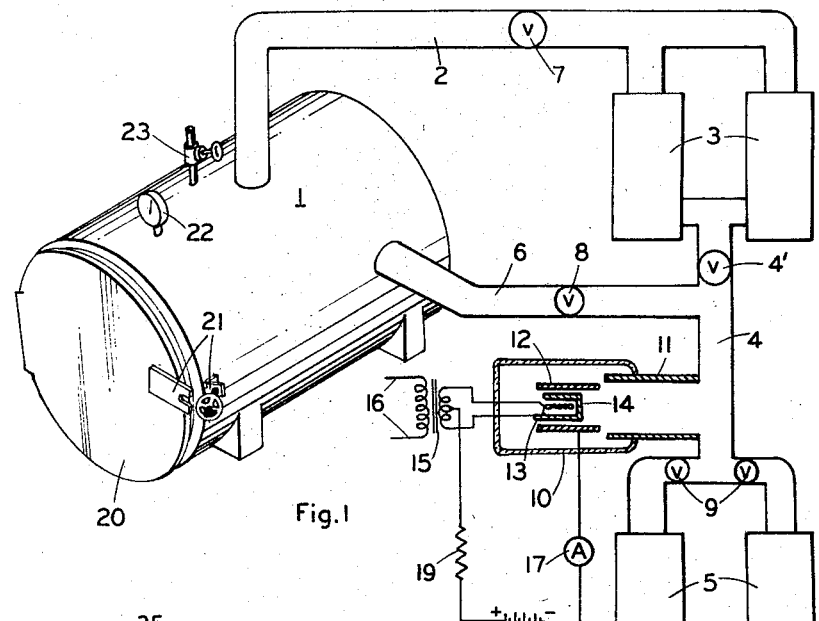
Fig.1
Fig.2
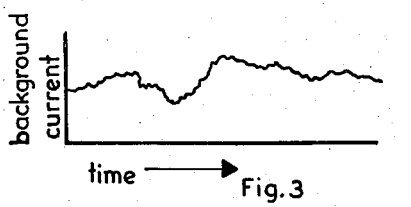
Fig.3
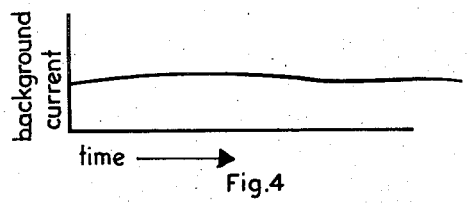
Fig.4
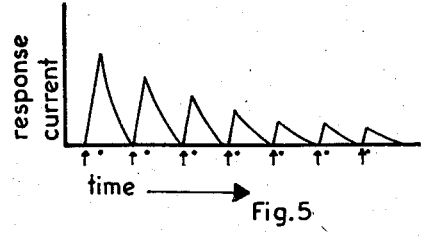
Fig.5
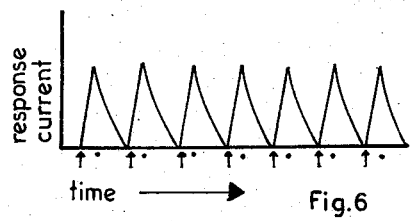
Fig.6
Inventors:
Walton E. Briggs
John A. Roberts
by Leslie B. Bayer
Their Attorney

United States Patent Office 2,897,437
Patented July 28, 1959

2,897,437

VACUUM LEAK DETECTION

Walton E. Briggs and John A. Roberts, Lynnfield Center, Mass., assignors to General Electric Company, a corporation of New York Application June 5, 1957, Serial No. 663,853

5 Claims. (Cl. 324—33)

Our invention relates to methods and apparatus for stabilizing and maintaining the sensitivity of the positive ion emission diode forming part of a detecting apparatus such as disclosed and claimed in United States Letters Patent 2,550,498, Chester W. Rice, granted April 24, 1951, when this diode is located in a vacuum system for detecting leaks therein.

The Rice apparatus is used for detecting substances such as certain gases, vapors, smokes, and similar matter in an atmosphere by noting the increase in current flow between the electrodes of a diode due to positive ion formation at its heated anode in the presence of said substances. The sensitive diode of the apparatus responds to certain types of substances such as the alkaline metals or other substances having ionizing potentials less than the electron work function of the electrodes, the halogens, or compounds of either. For certain substances, such as the alkaline metals and their compounds, the ion formation apparently occurs by ionization of the substance when it comes into contact with the more positively charged and heated electrode of the diode. For others, such as the halogens and their compounds, the substances appear to cause ion formation only in the presence of what might be called sensitizing materials, such as the alkaline metals and their compounds; and it further appears in this case that the sensitizing materials themselves are actually ionized to afford the desired positive ion current.

The apparatus of the Rice patent has been used for detecting leaks in pressure systems as well as leaks in vacuum systems. In either case, a tracer gas or substance to which the diode of the apparatus is sensitive is used for locating the leak. When used in detecting leaks in pressure systems, air containing the tracer gas is supplied under pressure to the systems and the suspected areas of the system are examined by a search tube through which the gas being tested is sucked in and supplied between the electrodes of the diode. When the suction end of the search tube passes over a leak, the presence of the leak is indicated by the increased conductivity of the diode due to the presence of the tracer gas which is usually a halogen-containing gas such as dichlorodifluoromethane. For indicating leaks in vacuum systems, the diode element of the detecting apparatus may form a part of, or be mounted inside, the system to be tested and the leak searched out by going over the outside of the system with a gaseous medium, such as a halogen compound, which is sucked into the system at a leak and applied to the elements of the diode by convection or diffusion where its presence is noted by the additional conduction of the diode. Since, in either case, the tracer gas most commonly employed for detecting leaks is a halogen compound, the apparatus has been commonly referred to as a halogen leak detector.

We have found that difficulties are encountered when using the sensitive element of the Rice detector for determining the location of leaks in vacuum apparatus by probing suspected areas on the outside of the apparatus with a halogen-containing gas. The diode emission current is often unsteady, making it difficult to differentiate between leak indication and random variations; and the sensitivity of the diode element declines markedly after a short while, seriously impairing its usefulness. Since the location of the leak is indicated after a time interval subsequent to the introduction of the tracer gas into the system through the leak, it is necessary to pass over the leak area several times before its location is definitely determined and this lack of sensitivity of the element to repeated exposures during such search effort, in addition to the unsteady emission current under certain vacuum conditions, greatly impairs the effectiveness of the Rice detector when used for detecting leaks in vacuum apparatus. The difficulties above noted are particularly noticeable at pressures below one micron of mercury and in small vacuum systems. We have also determined that difficulties are experienced at pressures greater than two hundred microns due to the slowness in recovery of the sensitive element after it has been exposed to the tracer gas and this slowness in recovery of the sensitive element makes it difficult to locate leaks as quickly as it is desired to do so in industrial applications. At still higher pressures, of the order of two hundred and fifty microns or higher, the sensitive element is subjected to corona effects and arcing which also renders it unsuited for its intended purpose.

Since these difficulties encountered in searching for leaks in vacuum systems are not encountered when searching for leaks in pressure systems, it would appear that the solution for detecting leaks in vacuum systems would be to convert them into pressure systems where the sensitive diode of the detecting apparatus is operated at atmospheric or near-atmospheric pressures. In most cases, however, this is not possible since the vacuum system is constructed to withstand pressures from without rather than pressures from within and the converted system may be productive of leaks under pressure conditions which are not the same as those which occur under vacuum conditions. Furthermore, it is not always possible to test a vacuum system under pressure conditions greater than atmospheric pressure since the components of such vacuum systems are constructed and arranged to resist pressures from without and gaskets and seals provided at access openings into the system are in most cases not suitable for resisting pressures from within greater than atmospheric presure.

We have determined that, if the sensitive element of the leak detector is operated at a controlled pressure in the presence of air within a desired range of from one micron to two hundred microns, the difficulties above noted will be eliminated and it will operate in a stable manner and maintain its sensitivity for long periods of time.

It is, consequently, an object of our invention to provide apparatus and methods of operation in accordance with our above observations whereby the sensitive element of a vapor detection apparatus is stabilized and maintains its sensitivity when used in vacuum leak detection.

Our invention, together with further objects and advantages thereof, will be best understood by reference to the following specification taken in connection with the accompanying drawing which represents two embodiments of apparatus suitable for use in industrial or other applications to determine leaks in vacuum systems.

In the drawing, Fig. 1 is a diagrammatic representation of apparatus suitable for operation in accordance with our invention;

Fig. 2 is another diagrammatic representation of another such apparatus;

Fig. 3 is a diagram showing the unsteadiness of the emission current of the diode of the leak detector when operating at low pressures without a continuous supply of air;

Fig. 4 is a like diagram indicating the steadiness obtained when operating at controlled pressures within the pressure range of our invention;

Fig. 5 is a diagram showing the decreased sensitivity of the diode with repeated operations when operating at pressures less than one micron; and Fig. 6 is a like diagram showing the maintained sensitivity of the diode when operating within the pressure range of our invention.

As previously stated, we have discovered that the sensitive diode element of a leak detector may be stabilized and maintained at substantially uniform sensitivity after repeated operations if it is maintained at a controlled pressure within the range of from one micron to two hundred microns. In the arrangement illustrated in Fig. 1, this result has been obtained by locating the diode of the leak detector at a particular place in the pumping system by which a desired vacuum is obtained in the vessel under test. As there illustrated, the vacuum vessel 1 is connected through a pipe 2 to diffusion pumps 3 which in turn are connected through pipe 4 and valve 4' to mechanical rough pumps 5. The rough pumps 5 are also connected through pipe 4 and a pipe 6 to vessel 1. A valve 7 is located in pipe line 2 to control the connection of vessel 1 to diffusion pumps 3 and a valve 8 is connected in pipe 6 to control the connection of the mechanical rough pumps 5 with vessel 1. The pipe to each of the rough pumps 5 is also provided with its own valve 9. The sensitive diode of the leak detector is enclosed within a casing 10 which is connected through a pipe 11 with pipe 4. This sensitive element comprises a collector electrode or cathode 12 and an anode 13 which is heated by filament 14 supplied when heating current through a transformer 15 from a suitable alternating current source of supply 16. The positive ion current flow between the anode 13 and the collector electrode 12 is indicated by a suitable instrument, such as a microammeter 17 connected in circuit with a suitable source of direct current supply 18 and a protective resistor 19.

The vessel 1, which contains articles to be treated under vacuum pressure conditions of one micron or less, is shown as provided with an access door 20 which may be held in closed position against a sealing gasket by means of a latch 21. The vessel is also provided with a vacuum gauge 22 and piping, including a valve 23, for admitting air at a controlled rate into the vacuum vessel.

When operating in accordance with our invention, pressure in vessel 1 is reduced by operating the mechanical pumps 5 through valves 8 and 9 with valves 4' and 7 closed until an optimum pressure is reached. Valve 8 is then closed and valves 4' and 7 opened and the pressure in vessel 1 reduced further by means of the diffusion pumps 3 operating in conjunction with the mechanical pumps 5 until a stable pressure is reached in vessel 1. Air is now bled through valve 23 into vessel 1 in such a manner as to obtain a constant pressure in the range of one micron to two hundred microns. If there is sufficient natural leakage to prevent the vessel 1 being pumped to pressures below one micron, it is not necessary to bleed air through valve 23.

If the system were attempted to be operated without a continuous supply of air, the background current through the diode of the leak detector would be of the unsteady nature illustrated in Fig. 3 of the drawing; whereas, when operating in accordance with our invention, this background current is smoothed out as illustrated in Fig. 4 of the drawing.

As previously indicated, the detection of a leak requires several trials during which the source of tracer gas is passed over the suspected leak location. If the vacuum in vessel 1 is maintained at one micron or less, the repeated actuation of the detector of the diode of the leak detector will result in decreased sensitivity as shown in Fig. 5 of the drawing. In this figure, the time at which the tracer gas is applied to the leak is indicated by the arrow and the time when the tracer gas was taken away from the leak is indicated by the dot. By operating within the desired pressure range of our invention, sensitivity of the element becomes uniform as indicated in Fig. 6 of the drawing where, as in Fig. 5, the arrows and dots, respectively, indicate when the tracer gas was applied to the leak and when it was removed therefrom.

It is thus seen that, by employing our invention, the operation of the leak detector is greatly improved and it is possible to determine with accuracy the location of a leak because of the steady emission of the diode of the detector and its maintained uniform sensitivity.

In Fig. 2, a vessel 24 containing a leak 25 is connected through a pipe 26 to pumps capable of attaining pressures of less than one micron in vessel 24. This pipe is provided with a valve 27 across which there is a branch pipe 28, each end of which is connected to pipe 26 on opposite sides of valve 27 through pipes 29 and 30. Each of these pipes 29 and 30 has a valve 31 and 32 which can be operated in order to control the amount of gas supplied through branch pipe 28. Air may be bled into branch pipe 28 through filter 33 which is connected thereto through a valve 34. Air may also be bled into the vessel 24 through a filter 35 which is connected to the vessel through a valve 36. Filters 33 and 35 are used for de-humidifying and purifying the air bled into the system. Any suitable absorbent, such as activated charcoal, may be used in these filters. The sensitive diode element 37 of the leak detector is enclosed within the branch pipe 28 as indicated in the enlarged portion of Fig. 2.

When detecting leaks in a system such as that shown in Fig. 2, vessel 24 is evacuated through pipe 26 to a pressure which may be of the order of ten microns. This operation is obtained by closing valves 31 and 32 while having valve 27 open. Valves 34 and 36 will also be closed during this operation. When it is desired to make a test for leakage, valve 27 is closed sufficiently to produce a pressure drop across it and valve 34 is opened slightly to give a flow of about one micron cubic foot per minute with valve 32 in a throttling position so as to maintain about five microns pressure at diode 37. Valve 31 is then opened slightly to sample the gas in vessel 24. If there is a leak as at 25 and a halogen-containing gas is sprayed over it, the positive flow of gas created through diode 37 at the desired pressure of five microns will give a dependable indication of the presence of this leak. It is, of course, apparent that valves 27 and 34 might be closed and valves 31 and 32 opened while valve 36 is adjusted to obtain a desired operating pressure at the diode 37 of the leak detector.

In each of the examples given above, the tracer gas employed was a dichlorodifluoromethane, although it is quite obvious that other halogen compounds could be used. It is, of course, apparent that, without departing from our invention, any vapor or gas of tracer material coming within the disclosures and equivalents of the substances referred to in the Rice patent may be used. It is also apparent that, instead of using a diode such as disclosed in the Rice patent, other forms of diode may be used such, for example, as disclosed in United States Letters Patent 2,795,716, John A. Roberts, granted to one of us on June 11, 1957.

While we have shown and described a number of embodiments of our invention, it will be obvious to those skilled in the art that various changes and modifications may be made without departing from our invention in its broader aspects and we therefore aim in the appended claims to cover all such changes and modifications as fall within the true spirit and scope of the invention.

What we claim as new and desire to secure by Letters Patent of the United States is:

1. The method of detecting the location of a leak in a vacuum system which comprises placing within said system a diode having electrodes exposed to the space within said vacuum system, applying an electrical potential difference between said electrodes of said diode, one of said electrodes being a heated anode sensitized for positive ion emission in the presence of a gas capable of facilitating the formation of positive ions at said sensitized anode, applying said gas progressively to localized areas of the exterior surface of said vacuum system to locate said leak by the introduction of said gas into said system through said leak and detecting its presence therein by observing changes in the current flow between said electrodes of said diode caused by the formation of positive ions at its said heated anode by said gas, and maintaining the stability and sensitivity of said diode by maintaining in said vacuum system at the electrodes of said diode a controlled pressure within the range of from one micron to two hundred microns.

2. The method of detecting the location of a leak in a vacuum system which is operable at internal pressures of less than two hundred microns when subject to deleterious air leakage at said pressures which comprises placing the positive ion emission diode of a halogen leak detector in said system with its electrodes exposed to the space therein, applying a gaseous substance of the class comprising the halogen elements and compounds thereof progressively to localized areas of the exterior surface of said vacuum system to locate said leak by the introduction of said gaseous substance into said system through said leak and detecting its presence therein by observing changes in the current flow between said electrodes of said positive ion emission diode due to the presence of said gaseous substance, and maintaining the stability and sensitivity of said diode by maintaining in said vacuum system at the electrodes of said diode a controlled pressure within the range of from one micron to two hundred microns.

3. The method of detecting the location of a leak in a vacuum system which is operable at internal pressures of less than two hundred microns when subject to deleterious air leakage at said pressures which comprises placing within said system a diode having electrodes exposed to the space within said vacuum system, applying an electrical potential difference between said electrodes of said diode, one of said electrodes being a heated anode sensitized for positive ion emission in the presence of a gas capable of facilitating the formation of positive ions at said sensitized anode, applying said gas progressively to localized areas of the exterior surface of said vacuum system to locate said leak by the introduction of said gas into said system through said leak and detecting its presence therein by observing changes in the current flow between said electrodes of said diode caused by the formation of positive ions at its said heated anode by said gas, and maintaining the stability and sensitivity of said diode by supplying air at a controlled rate into said vacuum system and maintaining a controlled pressure within the range of from one micron to two hundred microns at the electrodes of said diode.

4. The method of detecting the location of a leak in a vacuum system which is operable at internal pressures of less than two hundred microns when subject to deleterious air leakage at said pressures which comprises placing the positive ion emission diode of a halogen leak detector in said system with its electrodes exposed to the space therein, applying a gaseous substance of the class comprising the halogen elements and compounds thereof progressively to localized areas of the exterior surface of said vacuum system to locate said leak by the introduction of said gaseous substance into said system through said leak and detecting its presence therein by observing changes in the current flow between said electrodes of said positive ion emission diode due to the presence of said gaseous substance, and maintaining the stability and sensitivity of said diode by supplying air at a controlled rate into said vacuum system and maintaining a controlled pressure within the range of from one micron to two hundred microns at the electrodes of said diode.

5. A vacuum system subject to detrimental air leakage at operating pressures of less than one micron, means capable of evacuating said system when it is subject to said detrimental air leakage to pressures less than one micron, means for detecting the presence of a tracer gas supplied to said vacuum system through a leak therein, said means including a positive ion emission diode having its electrodes exposed to the space within said vacuum system and having a heated anode which is sensitized for ion emission in the presence of said tracer gas which is capable of facilitating the formation of positive ions at said sensitized anode, and means for maintaining at the electrodes of said diode a controlled pressure within the range of from one micron to two hundred microns, said controlled pressure being obtained at said diode even though the remainder of said system is at an operating pressure of less than one micron through use of a bypass selectively connecting said diode in said system, said bypass including a valve to control the gas from said system supplied therethrough and valved control means for bleeding air into said bypass.

References Cited in the file of this patent

UNITED STATES PATENTS

| | | |
|---|---|---|
| 2,486,199 | Nier | Oct. 25, 1949 |
| 2,507,321 | Sherwood | May 9, 1950 |
| 2,579,352 | White | Dec. 18, 1951 |
| 2,814,018 | Zemany | Nov. 19, 1957 |